(12) United States Patent
Bridger

(10) Patent No.: US 8,405,637 B2
(45) Date of Patent: *Mar. 26, 2013

(54) OPTICAL POSITION SENSING SYSTEM AND OPTICAL POSITION SENSOR ASSEMBLY WITH CONVEX IMAGING WINDOW

(75) Inventor: Simon James Bridger, Auckland (NZ)

(73) Assignee: Next Holdings Limited (NZ)

( * ) Notice: Subject to any disclaimer, the term of this patent is extended or adjusted under 35 U.S.C. 154(b) by 727 days.

This patent is subject to a terminal disclaimer.

(21) Appl. No.: 12/428,865

(22) Filed: Apr. 23, 2009

(65) Prior Publication Data

US 2009/0237376 A1   Sep. 24, 2009

Related U.S. Application Data

(63) Continuation of application No. 12/350,220, filed on Jan. 7, 2009.

(60) Provisional application No. 61/019,404, filed on Jan. 7, 2008.

(51) Int. Cl.
*G06F 3/042* (2006.01)

(52) U.S. Cl. .......................... 345/175; 345/166; 250/216

(58) Field of Classification Search ................... 250/216
See application file for complete search history.

(56) References Cited

U.S. PATENT DOCUMENTS

| | | | |
|---|---|---|---|
| 844,152 A | 2/1907 | Little | |
| 2,407,680 A | 9/1946 | Palmquist et al. | |
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |
| 3,360,654 A | 12/1967 | Muller | |
| 3,478,220 A | 11/1969 | Milroy | |
| 3,563,771 A | 2/1971 | Tung | |
| 3,613,066 A | 10/1971 | Cooreman | |
| 3,764,813 A | 10/1973 | Clement et al. | |
| 3,775,560 A | 11/1973 | Ebeling et al. | |

(Continued)

FOREIGN PATENT DOCUMENTS

| | | |
|---|---|---|
| AU | 7225001 | 1/2002 |
| AU | 2003233728 | 12/2003 |

(Continued)

OTHER PUBLICATIONS

Anon, "SMART Board Specifications Model 680i", XP7915047 *Retrieved from the Internet*: URL:http://www2.smarttech.com/kbdoc/74231 [retrieved on Sep. 23, 2010] *the whole document*, 2008, pp. 1-5.

(Continued)

*Primary Examiner* — Dismery Mercedes

(74) *Attorney, Agent, or Firm* — Kilpatrick Townsend & Stockton LLP

(57) ABSTRACT

An optical position sensing system includes a bezel surrounding a display, a position sensor assembly, and a processor for calculating touch locations. Prismatic film may be applied to the bezel. Each optical position sensor assembly includes a body. A lens holder holds an imaging window on a first side and a single element aspherical lens on a second side. The imaging window has an inside face shaped to form a shallow convex surface. The lens holder is mounted to a front face of the body such that the lens is aligned with an opening in the body. An optical sensor is mounted to a rear face of the body and aligned with the opening. A radiation source is positioned within the body above the lens holder and behind an illumination window. A light path separator is positioned between the illumination window and the imaging window.

32 Claims, 7 Drawing Sheets

U.S. PATENT DOCUMENTS

| | | | |
|---|---|---|---|
| 3,810,804 A | 5/1974 | Rowland | |
| 3,830,682 A | 8/1974 | Rowland | |
| 3,857,022 A | 12/1974 | Rebane et al. | |
| 3,860,754 A | 1/1975 | Johnson et al. | |
| 4,107,522 A | 8/1978 | Walter | |
| 4,144,449 A | 3/1979 | Funk et al. | |
| 4,243,618 A | 1/1981 | Van Arnam | |
| 4,243,879 A | 1/1981 | Carroll et al. | |
| 4,247,767 A | 1/1981 | O'Brien et al. | |
| 4,329,037 A | 5/1982 | Caviness | |
| 4,420,261 A | 12/1983 | Barlow et al. | |
| 4,459,476 A | 7/1984 | Weissmueller et al. | |
| 4,468,694 A | 8/1984 | Edgar | |
| 4,486,363 A | 12/1984 | Pricone et al. | |
| 4,507,557 A | 3/1985 | Tsikos | |
| 4,542,375 A | 9/1985 | Alles et al. | |
| 4,550,250 A | 10/1985 | Mueller et al. | |
| 4,553,842 A | 11/1985 | Griffin | |
| 4,558,313 A | 12/1985 | Garwin et al. | |
| 4,601,861 A | 7/1986 | Pricone et al. | |
| 4,656,513 A * | 4/1987 | Langenkamp | 348/465 |
| 4,672,364 A | 6/1987 | Lucas | |
| 4,673,918 A | 6/1987 | Adler et al. | |
| 4,688,933 A | 8/1987 | Lapeyre | |
| 4,703,316 A | 10/1987 | Sherbeck | |
| 4,710,760 A | 12/1987 | Kasday | |
| 4,737,631 A | 4/1988 | Sasaki et al. | |
| 4,742,221 A | 5/1988 | Sasaki et al. | |
| 4,746,770 A | 5/1988 | McAvinney | |
| 4,762,990 A | 8/1988 | Caswell et al. | |
| 4,766,424 A | 8/1988 | Adler et al. | |
| 4,782,328 A | 11/1988 | Denlinger | |
| 4,811,004 A | 3/1989 | Person et al. | |
| 4,818,826 A | 4/1989 | Kimura | |
| 4,820,050 A * | 4/1989 | Griffin | 356/621 |
| 4,822,145 A | 4/1989 | Staelin | |
| 4,831,455 A | 5/1989 | Ishikawa et al. | |
| 4,851,664 A | 7/1989 | Rieger | |
| 4,868,551 A | 9/1989 | Arditty et al. | |
| 4,868,912 A | 9/1989 | Doering | |
| 4,888,479 A | 12/1989 | Tamaru | |
| 4,893,120 A | 1/1990 | Doering et al. | |
| 4,916,308 A | 4/1990 | Meadows | |
| 4,928,094 A | 5/1990 | Smith | |
| 4,943,806 A | 7/1990 | Masters et al. | |
| 4,980,547 A | 12/1990 | Griffin | |
| 4,990,901 A | 2/1991 | Beiswenger | |
| 5,025,314 A | 6/1991 | Tang et al. | |
| 5,025,411 A | 6/1991 | Tallman et al. | |
| 5,043,751 A | 8/1991 | Rice | |
| 5,097,516 A | 3/1992 | Amir | |
| 5,103,085 A | 4/1992 | Zimmerman | |
| 5,103,249 A | 4/1992 | Keene | |
| 5,105,186 A | 4/1992 | May | |
| 5,109,435 A | 4/1992 | Lo et al. | |
| 5,130,794 A | 7/1992 | Ritchey | |
| 5,140,647 A | 8/1992 | Ise et al. | |
| 5,148,015 A | 9/1992 | Dolan | |
| 5,162,618 A | 11/1992 | Knowles | |
| 5,162,783 A | 11/1992 | Moreno | |
| 5,164,714 A | 11/1992 | Wehrer | |
| 5,168,531 A | 12/1992 | Sigel | |
| 5,177,328 A | 1/1993 | Ito et al. | |
| 5,179,369 A | 1/1993 | Person et al. | |
| 5,196,835 A | 3/1993 | Blue et al. | |
| 5,196,836 A | 3/1993 | Williams | |
| 5,200,851 A | 4/1993 | Coderre et al. | |
| 5,200,861 A | 4/1993 | Moskovich | |
| 5,233,502 A | 8/1993 | Beatty et al. | |
| 5,239,152 A | 8/1993 | Caldwell et al. | |
| 5,239,373 A | 8/1993 | Tang et al. | |
| 5,272,470 A | 12/1993 | Zetts | |
| 5,317,140 A | 5/1994 | Dunthorn | |
| 5,359,155 A | 10/1994 | Helser | |
| 5,374,971 A | 12/1994 | Clapp et al. | |
| 5,414,413 A | 5/1995 | Tamaru et al. | |
| 5,422,494 A | 6/1995 | West et al. | |
| 5,448,263 A | 9/1995 | Martin | |
| 5,457,289 A | 10/1995 | Huang et al. | |
| 5,483,261 A | 1/1996 | Yasutake | |
| 5,483,603 A | 1/1996 | Luke et al. | |
| 5,484,966 A | 1/1996 | Segen | |
| 5,490,655 A | 2/1996 | Bates | |
| 5,502,568 A | 3/1996 | Ogawa et al. | |
| 5,525,764 A | 6/1996 | Junkins et al. | |
| 5,528,263 A | 6/1996 | Platzker et al. | |
| 5,528,290 A | 6/1996 | Saund | |
| 5,537,107 A | 7/1996 | Funado | |
| 5,541,372 A | 7/1996 | Baller et al. | |
| 5,554,828 A | 9/1996 | Primm | |
| 5,581,276 A | 12/1996 | Cipolla et al. | |
| 5,581,637 A | 12/1996 | Cass et al. | |
| 5,591,945 A | 1/1997 | Kent | |
| 5,594,469 A | 1/1997 | Freeman et al. | |
| 5,594,502 A | 1/1997 | Bito et al. | |
| 5,617,312 A | 4/1997 | Iura et al. | |
| 5,638,092 A | 6/1997 | Eng et al. | |
| 5,670,755 A | 9/1997 | Kwon | |
| 5,686,942 A | 11/1997 | Ball | |
| 5,698,845 A | 12/1997 | Kodama et al. | |
| 5,712,024 A | 1/1998 | Okuzaki et al. | |
| 5,729,704 A | 3/1998 | Stone et al. | |
| 5,734,375 A | 3/1998 | Knox et al. | |
| 5,736,686 A | 4/1998 | Perret, Jr. et al. | |
| 5,737,740 A | 4/1998 | Henderson et al. | |
| 5,739,479 A | 4/1998 | Davis-Cannon et al. | |
| 5,745,116 A | 4/1998 | Pisutha-Arnond | |
| 5,764,223 A | 6/1998 | Chang et al. | |
| 5,771,039 A | 6/1998 | Ditzik | |
| 5,784,054 A | 7/1998 | Armstrong et al. | |
| 5,785,439 A | 7/1998 | Bowen | |
| 5,786,810 A | 7/1998 | Knox et al. | |
| 5,790,910 A | 8/1998 | Haskin | |
| 5,801,704 A | 9/1998 | Oohara et al. | |
| 5,804,773 A | 9/1998 | Wilson et al. | |
| 5,818,421 A | 10/1998 | Ogino et al. | |
| 5,818,424 A | 10/1998 | Korth | |
| 5,819,201 A | 10/1998 | DeGraaf | |
| 5,825,352 A | 10/1998 | Bisset et al. | |
| 5,831,602 A | 11/1998 | Sato et al. | |
| 5,877,459 A | 3/1999 | Prater | |
| 5,909,210 A | 6/1999 | Knox et al. | |
| 5,911,004 A | 6/1999 | Ohuchi et al. | |
| 5,914,709 A | 6/1999 | Graham et al. | |
| 5,920,342 A | 7/1999 | Umeda et al. | |
| 5,936,615 A | 8/1999 | Waters | |
| 5,936,770 A | 8/1999 | Nestegard et al. | |
| 5,940,065 A | 8/1999 | Babb et al. | |
| 5,943,783 A | 8/1999 | Jackson | |
| 5,963,199 A | 10/1999 | Kato et al. | |
| 5,982,352 A | 11/1999 | Pryor | |
| 5,988,645 A | 11/1999 | Downing | |
| 5,990,469 A * | 11/1999 | Bechtel et al. | 250/208.1 |
| 5,990,874 A | 11/1999 | Tsumura et al. | |
| 6,002,808 A | 12/1999 | Freeman | |
| 6,008,798 A | 12/1999 | Mato, Jr. et al. | |
| 6,015,214 A | 1/2000 | Heenan et al. | |
| 6,020,878 A | 2/2000 | Robinson | |
| 6,031,524 A | 2/2000 | Kunert | |
| 6,031,531 A | 2/2000 | Kimble | |
| 6,061,177 A | 5/2000 | Fujimoto | |
| 6,067,080 A | 5/2000 | Holtzman | |
| 6,075,905 A | 6/2000 | Herman et al. | |
| 6,076,041 A | 6/2000 | Watanabe | |
| 6,091,406 A | 7/2000 | Kambara et al. | |
| 6,100,538 A | 8/2000 | Ogawa | |
| 6,104,387 A | 8/2000 | Chery et al. | |
| 6,118,433 A | 9/2000 | Jenkin et al. | |
| 6,122,865 A | 9/2000 | Branc et al. | |
| 6,128,003 A | 10/2000 | Smith et al. | |
| 6,141,000 A | 10/2000 | Martin | |
| 6,147,678 A | 11/2000 | Kumar et al. | |
| 6,153,836 A | 11/2000 | Goszyk | |
| 6,161,066 A | 12/2000 | Wright et al. | |
| 6,179,426 B1 | 1/2001 | Rodriguez, Jr. et al. | |
| 6,188,388 B1 | 2/2001 | Arita et al. | |
| 6,191,773 B1 | 2/2001 | Maruno et al. | |

| Patent No. | Date | Name |
|---|---|---|
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,285,359 B1 | 9/2001 | Ogasawara et al. |
| 6,310,610 B1 | 10/2001 | Beaton et al. |
| 6,320,597 B1 | 11/2001 | Van Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 * | 3/2002 | Murakami et al. ............ 250/221 |
| 6,377,228 B1 | 4/2002 | Jenkin et al. |
| 6,384,743 B1 | 5/2002 | Vanderheiden |
| 6,406,758 B1 | 6/2002 | Bottari et al. |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,501,461 B2 | 12/2002 | Holtzman |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,518,960 B2 | 2/2003 | Omura et al. |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,537,673 B2 | 3/2003 | Sada et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,664,952 B2 | 12/2003 | Iwamoto et al. |
| 6,670,985 B2 * | 12/2003 | Karube et al. ............. 348/207.1 |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,696,681 B2 * | 2/2004 | Kodama ..................... 250/216 |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,727,885 B1 | 4/2004 | Ishino et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,741,267 B1 | 5/2004 | Van Ieperen |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,767,102 B1 | 7/2004 | Heenan et al. |
| 6,774,889 B1 | 8/2004 | Zhang et al. |
| 6,803,906 B1 | 10/2004 | Morrison et al. |
| 6,828,959 B2 | 12/2004 | Takekawa et al. |
| 6,864,882 B2 | 3/2005 | Newton |
| 6,909,425 B2 | 6/2005 | Matsuda et al. |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,029 B2 | 9/2005 | Katagiri et al. |
| 6,947,032 B2 | 9/2005 | Morrison et al. |
| 6,952,202 B2 | 10/2005 | Hirabayashi |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,112,779 B2 * | 9/2006 | Suda et al. ................ 250/226 |
| 7,113,174 B1 | 9/2006 | Takekawa et al. |
| 7,121,470 B2 | 10/2006 | McCall et al. |
| 7,133,032 B2 | 11/2006 | Cok |
| 7,151,533 B2 | 12/2006 | Van Ieperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,227,526 B2 | 6/2007 | Hildreth et al. |
| 7,230,608 B2 | 6/2007 | Cok |
| 7,232,986 B2 | 6/2007 | Worthington et al. |
| 7,236,132 B1 | 6/2007 | Lin et al. |
| 7,236,154 B1 | 6/2007 | Kerr et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,288,751 B2 * | 10/2007 | Cartlidge et al. .......... 250/208.1 |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,432,914 B2 | 10/2008 | Kobayashi et al. |
| 7,460,110 B2 | 12/2008 | Ung et al. |

| | | |
|---|---|---|
| 7,477,241 B2 | 1/2009 | Lieberman et al. |
| 7,479,949 B2 | 1/2009 | Jobs et al. |
| 7,492,357 B2 | 2/2009 | Morrison et al. |
| 7,499,037 B2 | 3/2009 | Lube |
| 7,515,138 B2 | 4/2009 | Sullivan |
| 7,515,141 B2 * | 4/2009 | Kobayashi ............... 345/173 |
| 7,522,156 B2 | 4/2009 | Sano et al. |
| 7,538,759 B2 | 5/2009 | Newton |
| 7,557,935 B2 * | 7/2009 | Baruch ................. 356/614 |
| 7,559,664 B1 | 7/2009 | Walleman et al. |
| 7,619,617 B2 | 11/2009 | Morrison et al. |
| 7,629,967 B2 | 12/2009 | Newton |
| 7,656,513 B2 * | 2/2010 | Lei ....................... 356/127 |
| 7,692,625 B2 | 4/2010 | Morrison et al. |
| 7,751,671 B1 * | 7/2010 | Newton et al. ............ 385/134 |
| 7,755,613 B2 | 7/2010 | Morrison et al. |
| 7,777,732 B2 | 8/2010 | Herz et al. |
| 7,781,722 B2 | 8/2010 | Lieberman et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0048169 A1 | 12/2001 | Nilsen et al. |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0145596 A1 | 10/2002 | Vardi |
| 2002/0163505 A1 | 11/2002 | Takekawa |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0034439 A1 | 2/2003 | Reime et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0147016 A1 | 8/2003 | Lin et al. |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman et al. |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0020612 A1 | 1/2005 | Gericke |
| 2005/0030287 A1 | 2/2005 | Sato |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0178953 A1 | 8/2005 | Worthington et al. |
| 2005/0190162 A1 | 9/2005 | Newton |
| 2005/0200612 A1 * | 9/2005 | Tanaka et al. ............... 345/175 |
| 2005/0218297 A1 * | 10/2005 | Suda et al. ................. 250/208.1 |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 * | 11/2005 | Newton ..................... 345/173 |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0033751 A1 | 2/2006 | Keely et al. |
| 2006/0034486 A1 | 2/2006 | Morrison et al. |
| 2006/0070187 A1 | 4/2006 | Chilson |
| 2006/0132432 A1 | 6/2006 | Bell |
| 2006/0139314 A1 | 6/2006 | Bell |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0202974 A1 | 9/2006 | Thielman |
| 2006/0227120 A1 | 10/2006 | Eikman |
| 2006/0232568 A1 * | 10/2006 | Tanaka et al. ............... 345/175 |
| 2006/0232830 A1 | 10/2006 | Kobayashi |
| 2006/0244734 A1 | 11/2006 | Hill et al. |
| 2006/0274067 A1 | 12/2006 | Hidai |
| 2006/0279558 A1 | 12/2006 | Van Delden et al. |
| 2006/0284858 A1 | 12/2006 | Rekimoto |
| 2007/0002028 A1 | 1/2007 | Morrison et al. |
| 2007/0019103 A1 | 1/2007 | Lieberman et al. |
| 2007/0059520 A1 | 3/2007 | Hatin et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0132742 A1 | 6/2007 | Chen et al. |
| 2007/0139932 A1 | 6/2007 | Sun et al. |
| 2007/0152977 A1 * | 7/2007 | Ng et al. ................... 345/173 |
| 2007/0152984 A1 | 7/2007 | Ording et al. |
| 2007/0152986 A1 | 7/2007 | Ogawa |
| 2007/0160162 A1 * | 7/2007 | Mitsuo et al. ............... 396/373 |
| 2007/0165007 A1 | 7/2007 | Morrison et al. |
| 2007/0167709 A1 | 7/2007 | Slayton et al. |
| 2007/0205994 A1 | 9/2007 | Van Ieperen |
| 2007/0206296 A1 * | 9/2007 | Itoh et al. .................. 359/738 |
| 2007/0215451 A1 | 9/2007 | Sasloff et al. |
| 2007/0236454 A1 | 10/2007 | Ung et al. |
| 2007/0247435 A1 | 10/2007 | Benko et al. |
| 2007/0273842 A1 | 11/2007 | Morrison et al. |
| 2008/0012835 A1 | 1/2008 | Rimon et al. |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 * | 3/2008 | Baruk ....................... 345/175 |
| 2008/0068352 A1 | 3/2008 | Worthington et al. |
| 2008/0083602 A1 | 4/2008 | Auger et al. |
| 2008/0103267 A1 | 5/2008 | Hurst et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0143682 A1 | 6/2008 | Shim et al. |
| 2008/0150913 A1 | 6/2008 | Bell et al. |
| 2008/0158170 A1 | 7/2008 | Herz et al. |
| 2008/0259050 A1 | 10/2008 | Lin et al. |
| 2008/0259052 A1 | 10/2008 | Lin et al. |

| | | |
|---|---|---|
| 2008/0259053 A1 | 10/2008 | Newton |
| 2009/0018398 A1* | 1/2009 | Segawa et al. ............... 600/178 |
| 2009/0030853 A1 | 1/2009 | De La Motte |
| 2009/0052182 A1* | 2/2009 | Matsuba et al. .............. 362/268 |
| 2009/0058832 A1 | 3/2009 | Newton |
| 2009/0058833 A1 | 3/2009 | Newton |
| 2009/0077504 A1 | 3/2009 | Bell et al. |
| 2009/0096908 A1* | 4/2009 | Amano ................... 348/333.01 |
| 2009/0122027 A1 | 5/2009 | Newton |
| 2009/0135162 A1 | 5/2009 | Van De Wijdeven et al. |
| 2009/0141002 A1 | 6/2009 | Sohn et al. |
| 2009/0146972 A1 | 6/2009 | Morrison et al. |
| 2009/0207144 A1 | 8/2009 | Bridger |
| 2009/0213093 A1 | 8/2009 | Bridger |
| 2009/0213094 A1 | 8/2009 | Bridger |
| 2009/0219256 A1 | 9/2009 | Newton |
| 2009/0278816 A1 | 11/2009 | Colson |
| 2009/0284495 A1 | 11/2009 | Geaghan et al. |
| 2009/0295755 A1 | 12/2009 | Chapman et al. |
| 2009/0309844 A1 | 12/2009 | Woo et al. |
| 2009/0309853 A1 | 12/2009 | Hildebrandt et al. |
| 2010/0009098 A1 | 1/2010 | Bai et al. |
| 2010/0045629 A1 | 2/2010 | Newton |
| 2010/0045634 A1 | 2/2010 | Su et al. |
| 2010/0079412 A1 | 4/2010 | Chiang et al. |
| 2010/0085330 A1 | 4/2010 | Newton |
| 2010/0090985 A1 | 4/2010 | Newton |
| 2010/0090987 A1 | 4/2010 | Lin et al. |
| 2010/0097353 A1 | 4/2010 | Newton |
| 2010/0103143 A1 | 4/2010 | Newton et al. |
| 2010/0177052 A1 | 7/2010 | Chang et al. |
| 2010/0182279 A1 | 7/2010 | Juni |
| 2010/0193259 A1 | 8/2010 | Wassvik |
| 2010/0207911 A1 | 8/2010 | Newton |
| 2010/0225588 A1 | 9/2010 | Newton et al. |
| 2010/0229090 A1 | 9/2010 | Newton et al. |
| 2010/0315379 A1 | 12/2010 | Allard et al. |
| 2011/0019204 A1 | 1/2011 | Bridger |
| 2011/0050649 A1 | 3/2011 | Newton et al. |
| 2011/0176082 A1 | 7/2011 | Allard et al. |
| 2011/0199335 A1 | 8/2011 | Li et al. |
| 2011/0199387 A1 | 8/2011 | Newton |
| 2011/0205151 A1 | 8/2011 | Newton et al. |
| 2011/0205155 A1 | 8/2011 | Newton et al. |
| 2011/0205185 A1 | 8/2011 | Newton et al. |
| 2011/0205186 A1 | 8/2011 | Newton et al. |
| 2011/0205189 A1 | 8/2011 | Newton |
| 2011/0221666 A1 | 9/2011 | Newton et al. |
| 2011/0234542 A1 | 9/2011 | Marson |

FOREIGN PATENT DOCUMENTS

| | | |
|---|---|---|
| AU | 2004211738 | 8/2004 |
| AU | 2006243730 | 11/2006 |
| CA | 2058219 | 4/1993 |
| CA | 2367864 | 4/1993 |
| CA | 2219886 | 4/1999 |
| CA | 2251221 | 4/1999 |
| CA | 2267733 | 10/1999 |
| CA | 2268208 | 10/1999 |
| CA | 2252302 | 4/2000 |
| CA | 2412878 | 1/2002 |
| CA | 2341918 | 9/2002 |
| CA | 2350152 | 12/2002 |
| CA | 2386094 | 12/2002 |
| CA | 2372868 | 8/2003 |
| CA | 2390503 | 12/2003 |
| CA | 2390506 | 12/2003 |
| CA | 2432770 | 12/2003 |
| CA | 2493236 | 12/2003 |
| CA | 2448603 | 5/2004 |
| CA | 2453873 | 7/2004 |
| CA | 2460449 | 9/2004 |
| CA | 2521418 | 10/2004 |
| CA | 2481396 | 3/2005 |
| CA | 2491582 | 7/2005 |
| CA | 2563566 | 11/2005 |
| CA | 2564262 | 11/2005 |
| CA | 2501214 | 9/2006 |
| CA | 2606863 | 11/2006 |
| CA | 2580046 | 9/2007 |
| CA | 2515955 | 1/2011 |
| CN | 1277349 | 12/2000 |
| CN | 1407506 | 4/2003 |
| CN | 1440539 | 9/2003 |
| CN | 1774692 | 5/2006 |
| CN | 1784649 | 6/2006 |
| CN | 1310126 | 4/2007 |
| CN | 101019096 | 8/2007 |
| CN | 101023582 | 8/2007 |
| CN | 101663637 | 3/2010 |
| CN | 101802759 | 8/2010 |
| CN | 101802760 | 8/2010 |
| DE | 3836429 | 5/1990 |
| DE | 19810452 | 12/1998 |
| DE | 60124549 | 9/2007 |
| DE | 102007021537 | 6/2008 |
| EP | 0125068 | 11/1984 |
| EP | 0181196 | 5/1986 |
| EP | 0279652 | 8/1988 |
| EP | 0347725 | 12/1989 |
| EP | 0420335 | 4/1991 |
| EP | 0657841 | 6/1995 |
| EP | 0762319 | 3/1997 |
| EP | 0829798 | 3/1998 |
| EP | 0843202 | 5/1998 |
| EP | 0897161 | 2/1999 |
| EP | 0911721 | 4/1999 |
| EP | 1059605 | 12/2000 |
| EP | 1262909 | 12/2002 |
| EP | 1297488 | 4/2003 |
| EP | 1420335 | 5/2004 |
| EP | 1450243 | 8/2004 |
| EP | 1457870 | 9/2004 |
| EP | 1471459 | 10/2004 |
| EP | 1517228 | 3/2005 |
| EP | 1550940 | 7/2005 |
| EP | 1577745 | 9/2005 |
| EP | 1599789 | 11/2005 |
| EP | 1611503 | 1/2006 |
| EP | 1674977 | 6/2006 |
| EP | 1736856 | 12/2006 |
| EP | 1739528 | 1/2007 |
| EP | 1739529 | 1/2007 |
| EP | 1741186 | 1/2007 |
| EP | 1759378 | 3/2007 |
| EP | 1766501 | 3/2007 |
| EP | 1830248 | 9/2007 |
| EP | 1877893 | 1/2008 |
| EP | 2135155 | 12/2009 |
| EP | 2195726 | 6/2010 |
| EP | 2250546 | 11/2010 |
| ES | 2279823 | 9/2007 |
| FR | 2521330 | 8/1983 |
| GB | 1575420 | 9/1980 |
| GB | 2176282 | 12/1986 |
| GB | 2204126 | 11/1988 |
| GB | 2263765 | 8/1993 |
| JP | 57211637 | 12/1982 |
| JP | 58146928 | 9/1983 |
| JP | 61196317 | 8/1986 |
| JP | 61260322 | 11/1986 |
| JP | 62005428 | 1/1987 |
| JP | 63223819 | 9/1988 |
| JP | 1061736 | 3/1989 |
| JP | 1154421 | 6/1989 |
| JP | 3054618 | 3/1991 |
| JP | 3244017 | 10/1991 |
| JP | 4350715 | 12/1992 |
| JP | 4355815 | 12/1992 |
| JP | 5181605 | 7/1993 |
| JP | 5189137 | 7/1993 |
| JP | 5197810 | 8/1993 |
| JP | 6110608 | 4/1994 |
| JP | 7110733 | 4/1995 |
| JP | 7160403 | 6/1995 |
| JP | 7230352 | 8/1995 |
| JP | 8016931 | 2/1996 |
| JP | 8108689 | 4/1996 |

| | | |
|---|---|---|
| JP | 8506193 | 7/1996 |
| JP | 8240407 | 9/1996 |
| JP | 8315152 | 11/1996 |
| JP | 9091094 | 4/1997 |
| JP | 9224111 | 8/1997 |
| JP | 9319501 | 12/1997 |
| JP | 10031546 | 2/1998 |
| JP | 10105324 | 4/1998 |
| JP | 10162698 | 6/1998 |
| JP | 10254623 | 9/1998 |
| JP | 11045155 | 2/1999 |
| JP | 11051644 | 2/1999 |
| JP | 11064026 | 3/1999 |
| JP | 11085376 | 3/1999 |
| JP | 11110116 | 4/1999 |
| JP | 11203042 | 7/1999 |
| JP | 11212692 | 8/1999 |
| JP | 11338687 | 12/1999 |
| JP | 2000105671 | 4/2000 |
| JP | 2000132340 | 5/2000 |
| JP | 2000259347 | 9/2000 |
| JP | 2001014091 | 1/2001 |
| JP | 2001075735 | 3/2001 |
| JP | 2001142642 | 5/2001 |
| JP | 2001166874 | 6/2001 |
| JP | 2001282445 | 10/2001 |
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 2003065716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO2007064804 | 6/2007 |
| WO | WO2007079590 | 7/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO2008128096 | 10/2008 |
| WO | WO2009029764 | 3/2009 |
| WO | WO2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Benko, et al., "Precise Selection Techniques for Multi-Touch Screens", *Conference on Human Factors in Computing Systems—Proceedings 2006*, 2: 1263-1273.

Buxton, et al., "Issues and Techniques in Touch-Sensitive Tablet Input", *Computer Graphics, Proceedings of SIGGRAPH'85*, 1985, 19(3): 215-223.

Canadian Patent Application No. 2412878, Office Action, mailed May 12, 2009, 4 pages.

"Composite List of Projects 1983 to 1989", *NASA Small Business Innovation Research Program*, Aug. 1990, 132 pages.

"Digital Vision Touch Technology", White Paper, *SMART Technologies Inc.*, Feb. 2003, 10 pages.

European Application No. 02253594.2, European Search Report, mailed Jan. 5, 2006, 3 pages.

European Application No. 03257166.3, Partial European Search Report, mailed May 29, 2006, 4 pages.

European Application No. 04251392.9, European Search Report, mailed Jan. 18, 2007, 3 pages.

European Application No. 04711522.5, Office Action, mailed Jun. 29, 2010, 8 pages.

European Application No. 04711522.5, Office Action, mailed Mar. 22, 2010, 1 page.

European Application No. 04711522.5, Supplementary European Search Report, mailed Mar. 3, 2010, 3 pages.

European Application No. 06019268.9, European Search Report and Search Opinion, mailed Nov. 24, 2006, 5 pages.

European Application No. 06019269.7, European Search Report and Search Opinion, mailed Nov. 23, 2006, 5 pages.

European Application No. 07250888.0, European Search Report and Search Opinion, mailed Jun. 22, 2007, 6 pages.

European Application No. 07701682.2, Supplementary European Search Report and Search Opinion, mailed Dec. 7, 2010, 10 pages.

European Application No. 08745663.8, Office Action, mailed Dec. 27, 2010, 13 pages.

European Application No. 08745663.8, Office Action, mailed Jul. 6, 2010, 6 pages.

Förstner, "On Estimating Rotations", *Institut für Photogrammetrie, Universität Bonn*, 12 pages.

Fukushige, et al., "Interactive 3D Pointing Device Using Mirror Reflections", *Graduate School of Engineering, Osaka University*, 2006, 231-235.

Funk, "CCDs in optical touch panels deliver high resolution", *Electronic Design*, Sep. 27, 1980, pp. 139-143.

Geer, "Will Gesture—Recognition Technology Point the Way?", *Industry Trends*, Oct. 2004, 20-23.

Hartley, "Multiple View Geometry in Computer Vision", *Cambridge University Press* First published 2000, Reprinted (with corrections) 2001, pp. 70-73, 92-93, and 98-99.

Heddier Electronic, "Store Window Presentations", Feb. 2, 2011, 2 pages.
Herot, et al., "One-Point Touch Input of Vector Information for Computer Displays", *Architecture Machine Group Massachusetts Institute of Technology* Cambridge, Massachusetts, Oct. 31, 1977, pp. 210-216.
Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.
Hu, et al., "Multiple-view 3-D Reconstruction Using a Mirror", *The University of Rochester*, May 2005, 14 pages.
International Application No. PCT/CA2001/00980, International Search Report, mailed Oct. 22, 2001, 3 pages.
International Application No. PCT/CA2004/001759, International Search Report and Written Opinion, mailed Feb. 21, 2005, 7 pages.
International Application No. PCT/CA2007/002184, International Search Report, mailed Mar. 13, 2008, 3 pages.
International Application No. PCT/CA2008/001350, International Search Report, mailed Oct. 17, 2008, 5 pages.
International Application No. PCT/CA2009/000733, International Search Report and Written Opinion, mailed Sep. 10, 2009, 6 pages.
International Application No. PCT/CA2010/001085, International Search Report, mailed Oct. 12, 2010, 4 pages.
International Application No. PCT/NZ2004/000029, International Preliminary Report on Patentability, issued May 20, 2005, 21 pages.
International Application No. PCT/NZ2004/000029, International Search Report and Written Opinion, mailed Jun. 10, 2004, 6 pages.
International Application No. PCT/NZ2005/000092, International Preliminary Report on Patentability, completed Dec. 30, 2006, 3 pages.
International Application No. PCT/NZ2005/000092, International Search Report, mailed Sep. 27, 2006, 4 pages.
International Application No. PCT/NZ2010/000049, International Search Report and Written Opinion, mailed Oct. 14, 2010, 12 pages.
International Application No. PCT/NZ2010/000051, International Search Report and Written Opinion, mailed Oct. 5, 2010, 15 pages.
International Application No. PCT/US2008/060102, International Preliminary Report on Patentability, mailed Oct. 22, 2009, 10 pages.
International Application No. PCT/US2008/060102, International Search Report and Written Opinion, mailed Feb. 12, 2009, 20 pages.
International Application No. PCT/US2008/074749, International Preliminary Report on Patentability, issuance Mar. 2, 2010, 9 pages.
International Application No. PCT/US2008/074749, International Search Report and Written Opinion, mailed Feb. 11, 2009, 15 pages.
International Application No. PCT/US2008/074755, International Preliminary Report on Patentability, issuance Mar. 2, 2010, 8 pages.
International Application No. PCT/US2008/074755, International Search Report and Written Opinion, mailed Jan. 29, 2009, 8 pages.
International Application No. PCT/US2009/030694, International Preliminary Report on Patentability, completion Apr. 26, 2010, 10 pages.
International Application No. PCT/US2009/030694, International Search Report, mailed Aug. 5, 2009, 5 pages.
International Application No. PCT/US2009/033624, International Preliminary Report on Patentability and Written Opinion, issuance Aug. 17, 2010, 6 pages.
International Application No. PCT/US2009/033624, International Search Report, mailed Mar. 29, 2010, 3 pages.
International Application No. PCT/US2009/042547, International Preliminary Report on Patentability, mailed Nov. 9, 2010, 6 pages.
International Application No. PCT/US2009/042547, International Search Report and Written Opinion, mailed Sep. 2, 2010, 12 pages.
International Application No. PCT/US2009/058682, International Search Report and Written Opinion, mailed Apr. 27, 2010, 15 pages.
International Application No. PCT/US2009/059193, International Search Report and Written Opinion, mailed Dec. 7, 2009, 15 pages.
International Application No. PCT/US2010/059050, International Search Report and Written Opinion, mailed Mar. 23, 2011, 9 pages.
International Application No. PCT/US2010/059104, International Search Report and Written Opinion, mailed Jun. 6, 2011, 14 pages.
International Application No. PCT/US2010/059078, International Search Report and Written Opinion, mailed Aug. 2, 2011, 17 pages.
"Introducing the NextWindow 1900 Optical Touch Screen", *A NextWindow White Paper, Next Window Human Touch*, May 22, 2007, 13 pages.
INTUIFACE Press Release, "IntuiLab introduces IntuiFace, an interactive table and its application platform", Nov. 30, 2007, 1 page.
INTUILAB, "Overview Page", Mar. 9, 2011, 1 page.
Japanese Patent Application No. 2005-000268, Office Action, mailed Jul. 5, 2010, Office Action—3 pages, English Translation—3 pages.
Japanese Patent Application No. 2006-502767, Office Action, mailed Jan. 20, 2009, Office Action—2 pages, English Translation—3 pages.
Japanese Patent Application No. 2006-502767, Office Action, mailed Jun. 22, 2010, Office Action—3 pages, English Translation—4 pages.
Japanese Patent Application No. 2007-511305, Office Action, mailed Feb. 1, 2011, Office Action—2 pages, English Translation—5 pages.
Japanese Patent Application No. 2007-511305, Office Action, mailed Sep. 6, 2011, Office Action—3 pages, English Translation—4 pages.
Kanatani, "Camera Calibration", *Geometric Computation for Machine Vision*, Oxford Engineering Science Series, 1993, 37(2): 56-63.
Korean Patent Application No. 10-2005-7014885, Office Action, dated Aug. 9, 2010, English Translation—5 pages.
Lane, et al., "Reflective Interaction in Virtual Environments", *Eurographics*, 2001, 20(3): 7 pages.
Lo, "Solid-state image sensor: technologies and applications", SPIE Proceedings, 1998, 3422: 70-80.
Loinaz, et al., "A 200-mW, 3.3-V, CMOS Color Camera IC Producing 352×288 24-b Video at 30 Frames", *IEEE Journal of Solid-State Circuits*, Dec. 1998, 33(12); 2092-2103.
Piccardi, et al., "Background subtraction techniques: a review", *2004 IEEE International Conference on Systems, Man and Cybernetics*, Oct. 10, 2004, 4: 3099-3104.
Pogue, "The Multi-Touch Screen", *POGUE's Posts*, Mar. 27, 2007, 13 pages.
Singapore Patent Application No. 201001122-9, Office Action, dated May 3, 2011, 9 pages.
Tappert, et al., "On-Line Handwriting Recognition—A Survey", *Proceedings of the 9th International Conference on Pattern Recognition (ICPR)*, Rome, IEEE Computer Society Press, Nov. 14-17, 1988, 2: 1123-1132.
"ThruGlass™ Projected Capacitive Touchscreens Specifications", *Micro Touch*, 2000, 4 pages.
"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol. 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.
"Touch Panel", *Veritas et Visus*, Sep. 2010, vol., 5, Nos. 2-3.
"Touch Panel", *Veritas et Visus*, Nov. 2010, vol. 5, No. 4.

Photobit Corporation, "VGA-format CMOS Camera-on-a-Chip for Multimedia Applications", 1999, 2 pages.

Villamor, et al., "Touch Gesture Reference Guide", Last updated Apr. 15, 2010, 7 pages.

Wang, et al., "Stereo camera calibration without absolute world coordinate information", *SPIE*, Jun. 14, 1995, 2620: 655-662.

Wrobel, et al., "Minimum Solutions for Orientation", *Calibration and Orientation of Cameras in Computer Vision, Springer Series in Information Sciences*, 2001, 34: 28-33.

* cited by examiner

OPTICAL POSITION SENSING SYSTEM AND OPTICAL POSITION SENSOR ASSEMBLY WITH CONVEX IMAGING WINDOW

RELATED APPLICATIONS

This application is a continuation of co-pending U.S. patent application Ser. No. 12/350,220 entitled "Optical Position Sensing System And Optical Position Sensor Assembly," which was filed on Jan. 7, 2009 and which in turn claims priority to U.S. Provisional Patent Application No. 61/019,404 entitled "Optical Position Sensor With Miniature Sensor," which was filed on Jan. 7, 2008.

TECHNICAL FIELD

The present invention relates generally to electronic sensors, and more particularly to optical position sensors, such as those used in connection with touch sensitive screens.

BACKGROUND OF THE INVENTION

Optical position sensing systems, such as those used in connection with computer displays, office machinery, gaming equipment, etc., rely on a combination of line-scan or area image cameras, digital signal processing, front or back illumination and algorithms to determine a point of touch. Many optical position sensing systems use cameras, orientated along the touch screen surface so as to image the bezel. In this way, the system can track the movement of any object close to the surface of the touch screen by detecting variations in illumination emitted by an illumination source, such as an infrared light source.

While cameras generally are more expensive than other types of detector devices that can be used in optical position sensing systems, such as photo-detectors (e.g., photo-diodes or photo-transistors), they allow greater accuracy for touch detection. As known in the art, cameras using both area scan or line scan sensors are typically expensive and too large in the dimensions which are critical to commercially viable small touch screens.

Conventional optical position sensing systems use optical position sensors comprising multiple refractive elements (i.e., multiple element lens systems). Typically, these refractive elements are plastic or glass lenses. Lenses commonly used in optical sensors and other camera devices are typically designed for imaging applications. They are designed to have low image distortion when imaging a plane surface. Ideally, when light is transmitted and/or refracted onto a lens, all the rays of light are converged to a single point, resulting in a clear image. However, in most lens systems light rays are diverted to different points due to lens imperfections and other influences. These influences are commonly called aberrations, and usually result in distorted images.

Conventional camera devices use multi-element lens systems because the use of multiple refractive elements makes it possible to correct and compensate for aberrations and image distortion over a single element lens system, increasing the clarity of the image. However, the use of multiple elements increases the overall size of the camera, especially the depth, and makes it more difficult to converge light rays at a single point. The problem is exacerbated in configurations where space is extremely limited. While distortion may be undesirable for imaging applications, this is not the case for optical position sensing. Thus, conventional position sensing systems do not require the primary benefit of a multi-lens system. Further, the increased size of multi-lens camera systems not only adds unwanted space to the overall system, but it also adds to the expense of manufacturing these systems.

Additionally, when focusing the lens of conventional multi-element lens systems, manufacturers must physically move the lens elements relative to the body and sensor of the camera. Commonly this is done by a threaded lens barrel, and this results in a camera height which is set by the lens diameter. This is a difficult process given the relatively small amount of available space in a position sensing system. Additionally the multi element lenses and the focusing mechanisms are not mechanically robust, and sensitive to vibration. Unlike imaging applications, slight movement in the optical path causes significant position errors, even when no image degradation would result.

In a retroreflective system, the triangle formed between the illumination source, the nearest point of the reflector, and the lens aperture, must subtend an angle less than the observation angle of the retroreflective material. Existing systems use low performance reflective materials such as beaded material, which compromise performance, and large screen sizes, so that the observation angle is large. Other known systems use expensive beam splitting optics, which are extremely susceptible to dust and contaminants blinding the camera. It is an objective of this invention to use high performance reflective material, on small screens, without expensive beam splitting optics, and with advantageous immunity to blinding from dust and other contaminants.

SUMMARY OF THE INVENTION

The present invention provides an optical position sensing system including an improved optical position sensor assembly. The optical position sensing system includes a display, a bezel surrounding the display, at least one position sensor assembly for emitting radiation to cause illumination of the bezel and for generating data signals representing detected variations in said illumination, and a processor for processing the data signals to calculate a location of a touch relative to the display. Reflectors may be mounted to a face of the bezel that is perpendicular to a viewing area of the display. The reflectors may comprise retroreflective material, such as a prismatic film or tape. The at least one optical position sensor assembly may be mounted to the display or to an overlay that is positioned over the display. The optical position sensor assembly may therefore include one or more alignment features for mounting the optical position sensor assembly to a flat surface, such as the display or overlay.

Each optical position sensor assembly includes a body having a front face and a rear face and an opening therethrough. A lens holder is mounted to the body. The lens holder has a first side and a second side. The first side comprises an imaging window and the second side holds a single element aspherical lens, which may have an f-theta characteristic. The lens holder is mounted to the front face of the body such that the lens is aligned with the opening in the body. An optical sensor is mounted to the rear face of the body and is positioned such that it is aligned with the opening. A radiation source is positioned within the body above the lens holder and behind an illumination window. A light path separator is positioned between the illumination window and the imaging window, such that a path of radiation emitted by the radiation source is optically separated from a view path of the optical sensor. The light path separator may be a flexible printed circuit board that drives the radiation source. Alternatively, the light path separator may be an integral subcomponent of the lens holder or other component of the assembly. In some embodiments, the radiation source and the optical sensor are mounted to a flexible printed circuit board.

The inside face of the imaging window may be shaped to form a shallow convex surface. The imaging window may also or alternatively be dyed to pass a wavelength of radiation emitted by the radiation source and to reject other wavelengths of radiation. For example, the imaging window may be dyed with an optical notch dye. An aperture may be located within the body forward of the lens, i.e., between the second side of the lens holder and the lens. Alternatively, the aperture may be located between the lens and the optical sensor. The assembly is such that the lens position is fixed and the focus of the lens is adjusted by changing the position of the optical sensor relative to the body. The optical sensor may be encapsulated with an encapsulant, with the encapsulant shaped to form a lensed surface. The lensed surface may be convex in a long axis of a photodiode area of the optical sensor.

These and other aspects and features of the invention will be described further in the detailed description below in connection with the appended drawings and claims.

DETAILED DESCRIPTION OF EXEMPLARY EMBODIMENTS OF THE INVENTION

The present invention provides a novel optical position sensor assembly and a position sensing system incorporating that assembly. The optical position sensor assembly of the present invention is a more compact, simple, robust, and cost efficient device than prior art optical sensors. Consequently, it is suited for use in LCD monitors and computers as well as optical position sensing systems used in devices such as mobile phones, PDAs, bar code scanners, gaming equipment, and other portable computing devices for which minimal device thickness is a priority.

Reference will now be made in detail to various and alternative exemplary embodiments and to the accompanying drawings, with like numerals representing substantially identical structural elements. Each example is provided by way of explanation only, and not as a limitation of the scope of invention. It will be apparent to those skilled in the art that modifications and variations can be made without departing from the scope or spirit of the present disclosure and the appended claims. For instance, features illustrated or described as part of one embodiment of the invention may be used in connections with another embodiment to yield a still further embodiment. Thus, it is intended that the present disclosure includes any and all modifications and variations as come within the scope of the appended claims and their equivalents.

FIG. 1 is an illustration of an exemplary optical position sensing system 100, sometimes referred to hereinafter as a touch screen system. As used herein, the terms "optical position sensing system" or "touch screen system" are meant to refer to a display 110 and the hardware and/or software components that provide position sensing or touch detection functionality. The exemplary touch screen system 100 includes a display 110 having one or more optical position sensing assembly 130 and interfaced to a computing device 150, which executes software and/or firmware for detecting a touch point (i.e., sensing the position of a pointer) on or near the display 110. The touch screen system thus enables a user to view and interact with visual output presented on the display 110. Those skilled in the art will also appreciate that some optical position sensing systems do not necessarily require a user to touch the display screen in order to interact with it. Accordingly, use of the term "touch" herein is intended to refer generally to an interaction between a pointer and a display screen and not specifically to contact between the pointer and the display screen.

Figure 1A:
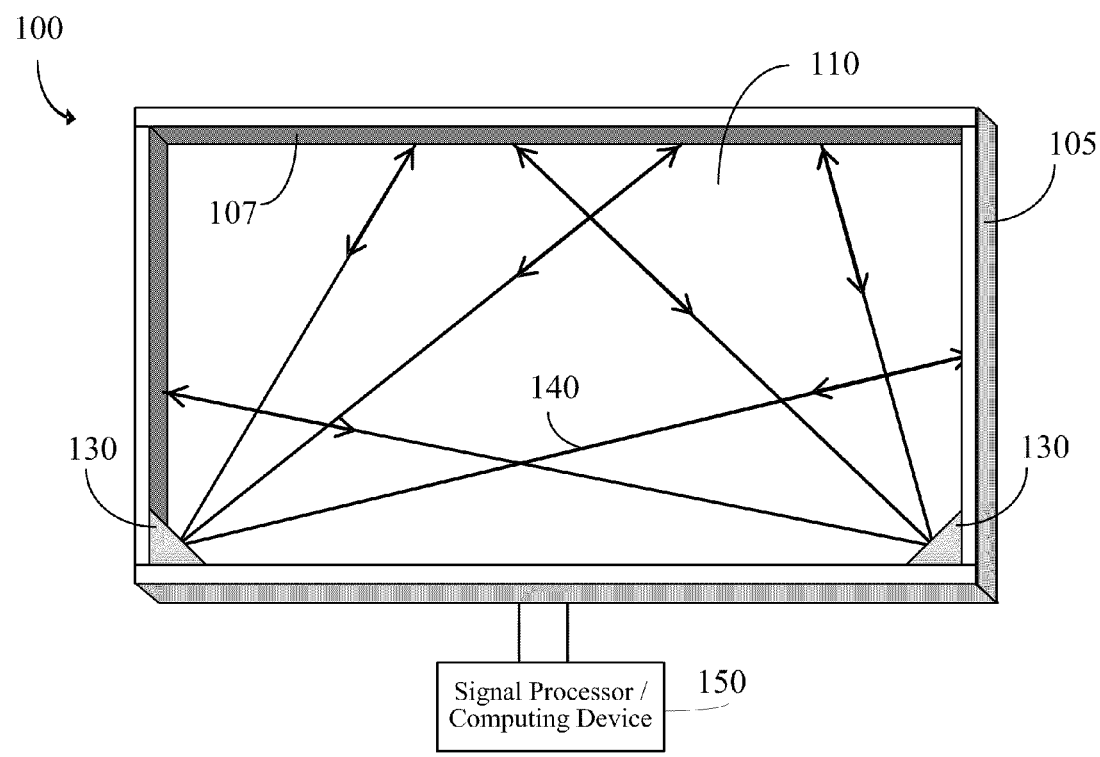
FIG. 1 is an illustration of an optical position sensing system, in accordance with certain exemplary embodiments of the present invention.

Optical touch screen systems, like the one illustrated in FIG. 1, rely on a combination of electromagnetic radiation, reflectors (or other light guides), optical sensors, digital signal processing, and algorithms to determine the position of a pointer within a viewing area. For example, as shown in FIG. 1A, a bezel 105 borders the viewing area of the display 110. Optical position sensing assemblies 130 are positioned in two or more corners of the display 110. Each optical position sensing assembly 130 can include an electromagnetic radiation source, such as an LED, and an optical sensor, such as a line scan or area scan camera, as will be further described with reference to FIG. 3.

The electromagnetic radiation 140 is guided throughout the viewing area by reflectors 107 applied to the bezel 105 and/or by refractors or other suitable light guide means. The electromagnetic radiation 140 thus "illuminates" the viewing area of the display 110. A pointer or other object placed within the viewing area disturbs the illumination and creates a shadow effect that can be detected by the optical sensors. The position of the shadow, which corresponds to a touch point, can be determined through signal processing and software algorithms, as is well known in the art.

In certain embodiments of the invention, the reflectors 107 comprise retroreflective material, such as film, tape or paint. A common retroreflective material is a "glass bead" film, which has a surface formed by a layer of tiny transparent spheres (i.e., glass beads). Another common retroreflective material is "prismatic" film, which includes an embedded layer of metallized triangular cube corner elements. In each of these forms of retroreflective film, incident electromagnetic radiation waves or beams (i.e. the light beams that enters the film) are reflected back toward the radiation source generally along a line that is parallel to the incident wave or beam. The return pattern (sometimes called "recursive signal") of a prismatic film is generally less diffuse than that of a glass bead film. As a result, prismatic films have higher reflectivity and are therefore generally more desirable for use as reflectors 107 in some embodiments of the invention. In other embodiments, the reflectors 107 may be any type of recursive or diffusive reflecting material or may be replaced by refractive materials.

The optical position sensing assemblies 130 thus transmit data regarding variations in the electromagnetic radiation 140 to a computing device 150 (or signal processor) that executes software and/or firmware for processing said data and calculating the location of a touch relative to the display 110. The computing device 150 may be any type of processor-driven device, such as a personal computer, a laptop computer, a handheld computer, a personal digital assistant (PDA), a digital and/or cellular telephone, a pager, a video game device, touch screen controller, digital signal processor, etc. These and other types of processor-driven devices will be apparent to those of skill in the art. As used in this discussion, the term "processor" can refer to any type of programmable logic device, including a microprocessor or any other type of similar device.

Figure 1B:
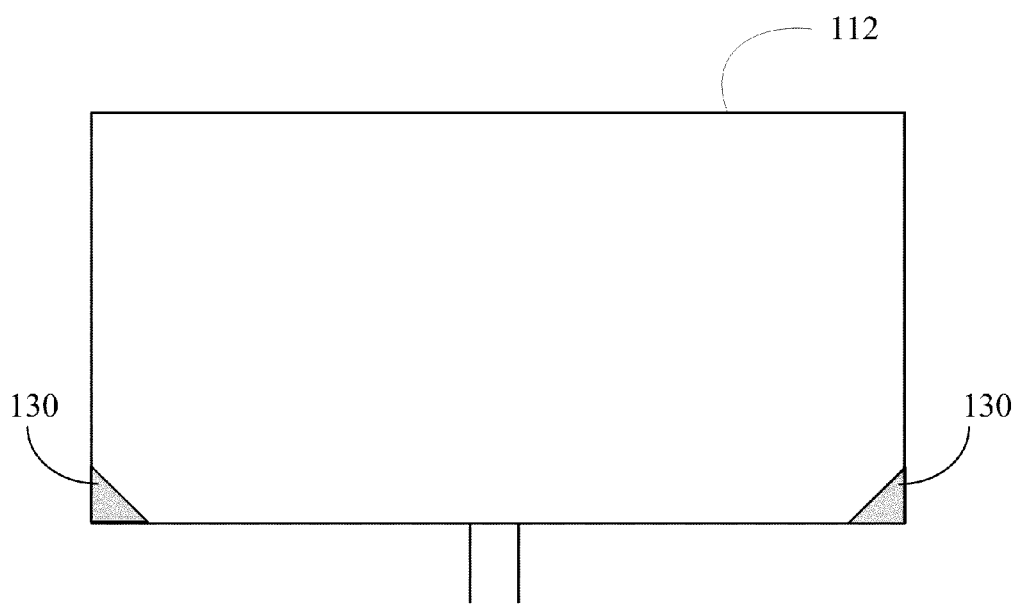

As shown in FIG. 1B, the optical position sensing assemblies 130 may be mounted to a glass or plastic (or other transparent material) overlay 112 that is positioned over the display 110. In other embodiments, however, the optical position sensing assemblies 130 may be mounted to the surface of the display 110 itself. The electromagnetic radiation sources emit electromagnetic radiation 140, such as ultraviolet, visible or infrared light, into the viewing area of the display 110.

Figure 2:
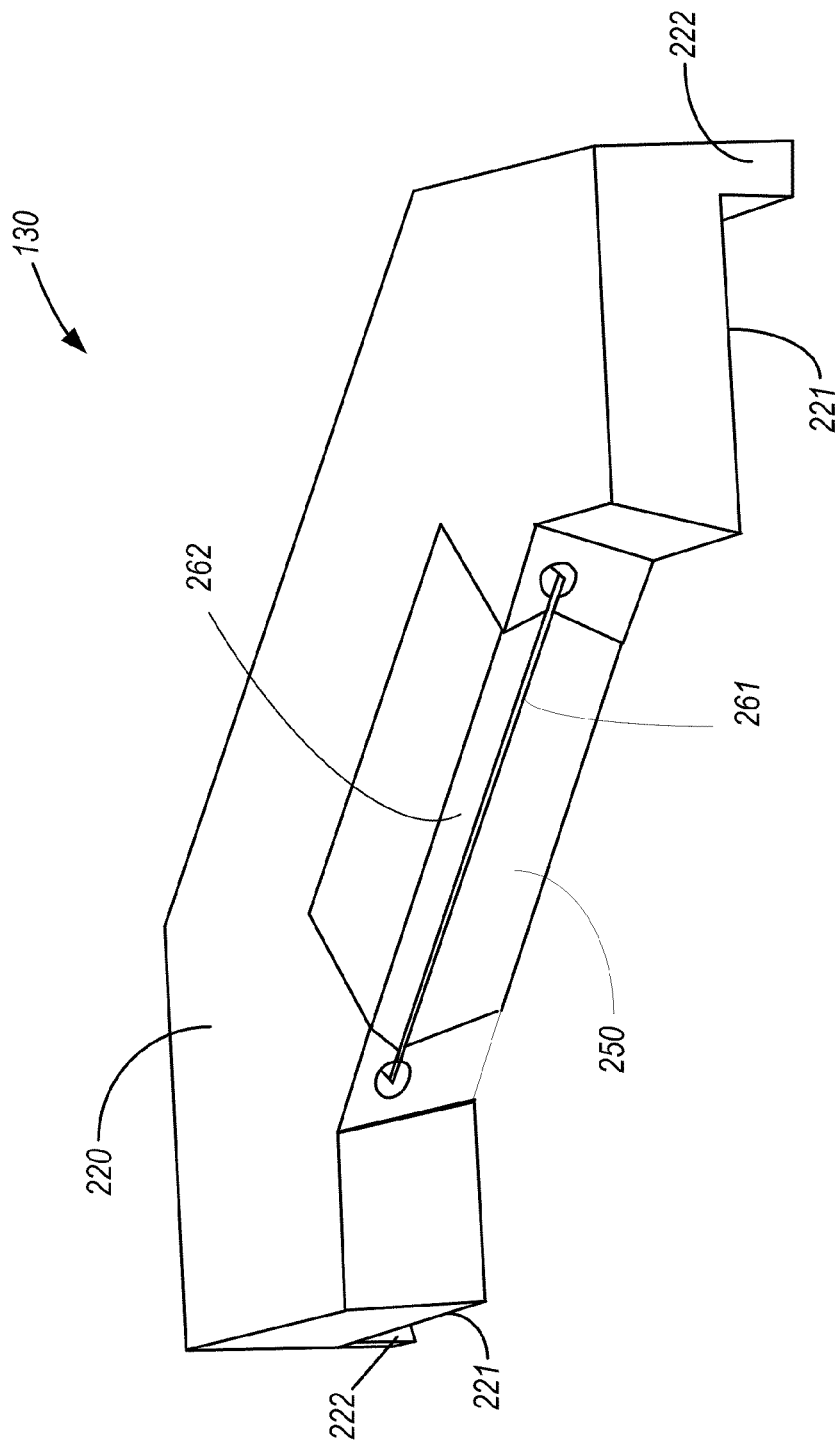
FIG. 2 is an illustration of an exemplary optical position sensor assembly according to the present invention.

FIG. 2 is an illustration of an exemplary optical position sensor assembly 130 of the present invention. The optical position sensor assembly 130 includes a body 220, which provides outer covering and protection to the various other components of the assembly. Body 220 may be constructed of a plastic or thermoplastic material (e.g., acrylic, Plexiglass, polycarbonate, etc.). In certain embodiments of the present invention, the entire assembly is made waterproof by joining the components with appropriate adhesives and sealants. Body 220 may also be constructed of other materials, as will be apparent to those skilled in the art.

Body 220 includes an alignment face 221 on a lateral side. Alignment face 221 allows body 220 to be placed on a flat surface, such as the surface of the display 110 or an overlay 112. Body 220 may further include alignment and locating features such as flanges 222 positioned proximate to alignment face 221 to the optical position sensor assembly 130 to align the yaw axis and x,y position of the optical position sensor assembly 130 with the edge of the display 110 or overlay 112. The optical position sensor assembly 130 includes a imaging window 250, an illuminator window 262, and light path separator 261, each of which will be described with reference to FIG. 3.

Figure 3:
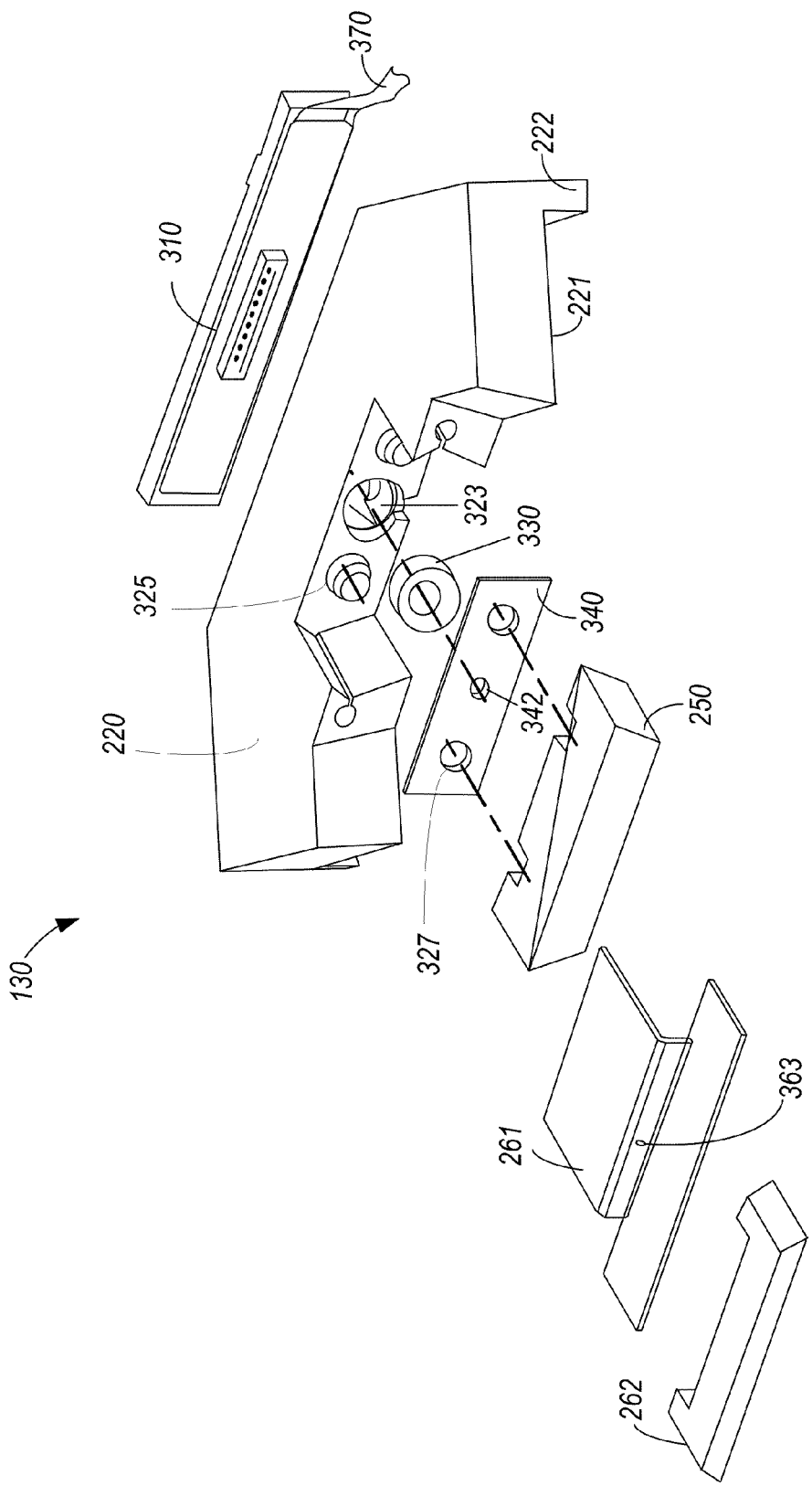
FIG. 3 is an exploded view of the exemplary optical position sensor assembly shown in FIG. 2.

FIG. 3 is an exploded view of the exemplary optical position sensor assembly 130. As shown, an optical sensor 310 is attached to the rear of the body 220 and is aligned behind an opening 323 within the body 220. The optical sensor 310 can be based on complementary metal oxide semiconductor (CMOS), charge coupled device (CCD), or charge injection device (CID) technologies, or any other sensors capable of detecting changes in electromagnetic radiation. Optical sensor 310 may be connected to the computing device 150 a flexible printed circuit board 370 or other suitable connector.

Positioned on each side of the opening 323 of the body 220 is a guide stud 325. Each guide stud 325 aligns with a guide hole 327 on an aperture plate 340. The aperture plate 340, which include the aperture 342, and a lens 330 fit into the back side of the imaging window 250 and may be configured to "snap" into or be otherwise secured into place. The imaging window 250, with the attached aperture plate 340 and lens 330, fits into the body 220 such that each guide stud 325 fits into the corresponding guide hole 327. The guide studs 325 and guide holes 327 ensure that the aperture 342 is substantially centered over the opening 323 (and thus the pixel array of the optical sensor 310). Due to the fixed position of the lens 330, focus may be adjusted by adjusting the position of optical sensor 310. In other words, adjusting the position of optical sensor 310 changes the convergence point of the light refracted through the lens 330 onto the optical sensor 310, thus changing the relative focus of lens 330.

The lens 330 is preferably a single element aspherical lens, with an f-theta characteristic, which can be constructed from transparent plastic material or glass. The single element lens results in reduced internal reflections without resorting to anti reflection coatings and improved accuracy and mechanical stability compared to known multi-element glass lens solutions. The f-theta lens characteristic is desirable in optical position sensing, as it results in a basically linear correspondence between pixel number and angle of refraction. As optical position sensors triangulate using the refraction angle, this results in a smooth low order linearizing function, compared to that from a distortion compensated multi-element design. The assembly illustrated in FIG. 3 results in front-aperture configuration (i.e., the aperture 341 is forward of the lens 330). In other embodiments, lens 330 may be positioned inside a lens holder or other structure.

Figure 5A:
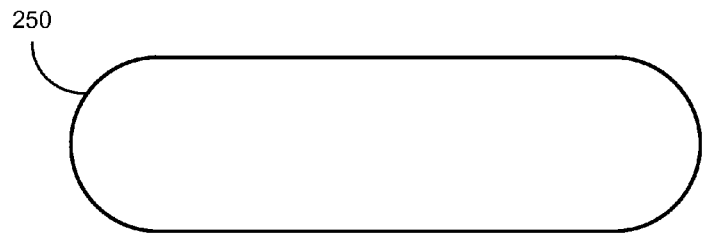
FIGS. 5A-5C are illustrations of a front window with additional active optical surface on the inner face.
Figure 5B:
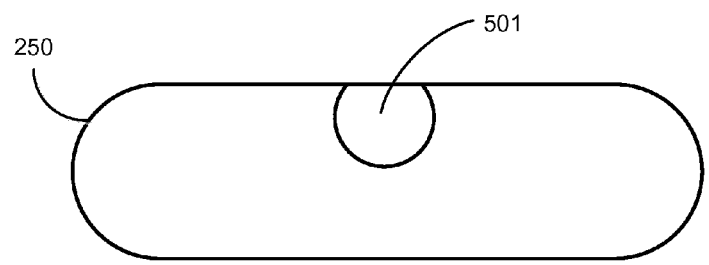
Figure 5C:
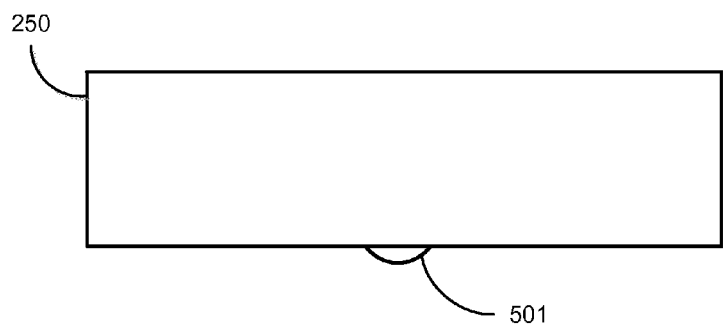

In still further embodiments, the imaging window 250 may be specifically shaped to function as an active optical surface, thereby enhancing the performance of the lens 330 without increasing complexity of the optical position sensor assembly 130, and without increasing internal reflections. In particular, the inside face of the imaging window 250 can be shaped to form a shallow convex surface, such as illustrated in FIG. 5. FIG. 5A is a front view of the imaging window 250, FIG. 5B is a rear view of the imaging window 250 (i.e., shown proximate to the aperture 342) and FIG. 5C is a top view of the of the imaging window 250. An example of a convex surface 501 can be seen in FIGS. 5B and 5C. As shown in FIG. 5A, no additional optical faces are added and the front surface of the imaging window 250 remains flat and easy to clean. Shaping the imaging window 250 in this or a similar manner allows a significant improvement in spot size of the entire optical system, while allowing the non-optical components of the assembly to remain unchanged.

In other embodiments, particularly those used for very small screens, the aperture 342 may be positioned behind the lens 330. For example, the aperture 342 may be formed as a feature of the body 220 or other component of the assembly 130.

Figure 6A:
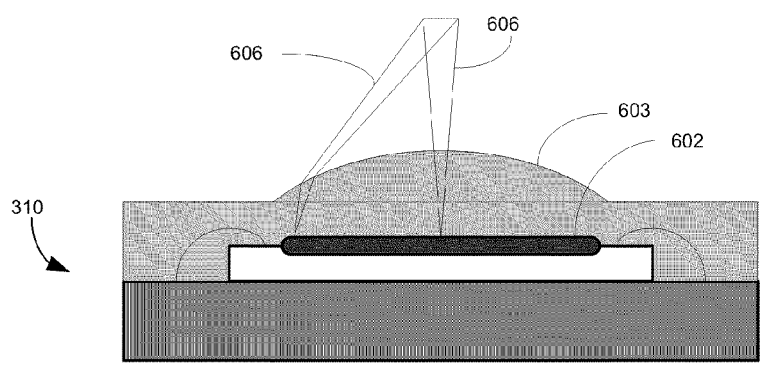
FIG. 6 is an illustration of an encapsulated optical sensor chip with integral lensed surface.

In some cases, the die of the optical sensor 310 may be encapsulated and the encapsulant will result in an unavoidable optical surface. Rather that being plane as is known in the art, this surface can be employed to help correct one or more aberrations of the total optical system. For example, FIG. 6A shows an illustration of an encapsulated optical sensor chip 310 with the encapsulant 603 forming an integral lensed surface, in accordance with embodiments of the present invention. The sensor encapsulant 603 is the only surface placed to improve the telecentricity of the optical system. When infrared radiation is used, commonly in the 850-950 nm range, the light is able to penetrate to a much greater depth in the photodiodes of the optical sensor 310 before being absorbed, compared to a visible light sensor. When a ray bundle 606 enters the optical sensor 310 at an oblique angle, as it does near the edges with a single element lens 330, the lensed surface formed by the encapsulant 603 results in some photoelectrons being produced in the adjacent pixel rather than the pixel through which the light entered. The effect is to reduce contrast.

By forming the encapsulant 603 above the optical sensor 310 to be convex in the long axis of the photodiode area 602, the ray bundle 606 is deflected so that its mean is telecentric at the sensor surface, thus enhancing the contrast. As a secondary effect, the increased Fresnel loss at the edges contributes to equalizing the signal at the edges. In some optical sensors 310, it may be difficult or impossible be able to get the ray bundle 606 perfectly telecentric with acceptable Fresnel loss, and a compromise can be used. For example, as shown in FIG. 6A, the encapsulant 603 may be formed into a lens geometry that reduces the entry angle of the ray bundles 606 at the edge of the photodiode area 602. By shaping the encapsulant 603 such that the angle of the ray bundle 606 is reduced from 52 degrees (with a flat encapsulant face) to 80 degrees (with an appropriately curved encapsulant edge face), the Fresnel loss can be reduced from approximately 64% to less than about 20% (assuming a ray bundle angle of 90 degrees is sought).

Figure 6B:
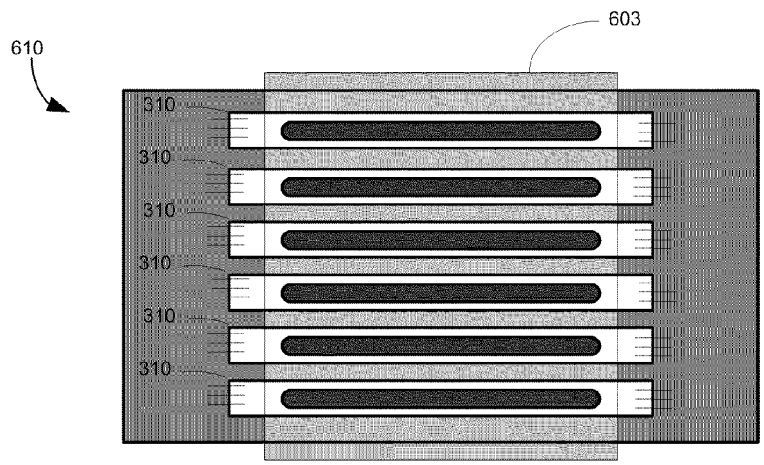

The lens formed by the encapsulant 603 can be curved in two axes. However as the light path in an optical position sensing system 100 is typically less than 5 degrees in height, and the photodiode area 602 of a typical optical sensor 310 is narrow, the encapsulant 603 may be formed as a simple singly-curved acircular cylindrical lens to achieve the same results. This cylindrical lens form is advantageous for manufacturing a panel 610 of encapsulated optical sensors 310, as shown in FIG. 6B, in a single operation without critical alignment of the die and optical tooling being required. This encapsulant 603 lens form may be cast directly, or be a separately molded part optically bonded to the optical sensor 310.

Referring again to FIG. 3, the light path separator 261 sits on top of the imaging window 250 and functions to separate the illumination path of the radiation source 363 and the view path of the optical sensor 310. In the illustrated embodiment, the light path separator 261 also functions as the mount for the radiation source 363, which is mounted to a top surface of the light path separator 261. For example, the light path separator 261 may be formed from one or more flexible printed circuit boards, which include circuits for driving the radiation source 363. In other implementations, the light path separator function may be provided by a separate component or may be integrated into another component such as the lens holder 477. The light path separator 261 may also have other compositions and designs, provided that it is highly opaque, as will be apparent to those skilled in the art. Preferably, the light path separator 261 is made of a material that absorbs the appropriate wavelengths of light. Where this is the case, it is desirable that the illumination window 262 is optically integral with the light path separator 261, such as by the use of clear or absorbent adhesive between them.

Illumination window 262 is positioned in front of the radiation source 363. Preferably the radiation source 363 is optically bonded to the illumination window 262 to eliminate Fresnel loss. Any suitable type of radiation source 363 may be used in the inventive optical position sensor assembly 130. For example, the energy source 363 may emit infrared (IR) or near-IR energy. Alternately, the energy source 363 may emit ultra violet or visible light energy (e.g., at one or more frequencies, wavelengths, or spectrums). The energy source 363 may also include one or more separate emission sources (emitters, generators, etc.). For example, the energy source 363 may include one or more light emitting diodes (LEDs).

The imaging window 250 commonly is dyed or coated to pass the operating wavelength and reject others. In certain embodiments of the invention, especially in embodiments employing the rear aperture design, the lens 330 may have the dye incorporated into it. In embodiments of the invention that use infrared light, the imaging window 250 and/or the lens 330 may be dyed or coated with a material that can filter specific wavelengths of light. Known dyes are long-wavelength pass filters that remove visible light, while passing infrared illumination. This is ideal where 950 nm LEDs are used as a radiation source 363. In other implementations (e.g., when using 850 nm LEDs) it may be desirable to block wavelengths between 900 nm and 1100 nm. An optical notch dye or coating (e.g., centered at 950 nm) can be added to any of the components in the optical paths 150, 330.

The optical sensor 310 may not only be operated at near infrared. In some embodiments, such as those employing optical sensors 310 with small pixels, focus may be enhanced by operation at shorter wavelengths, such as in the range 360-400 nm. In certain embodiments of the invention, the rejection of interference from artificial lighting may be further enhanced by ensuring that the shutter of each optical sensor 310 is synchronized to 2× the mains frequency +/−10%.

Figure 4A:
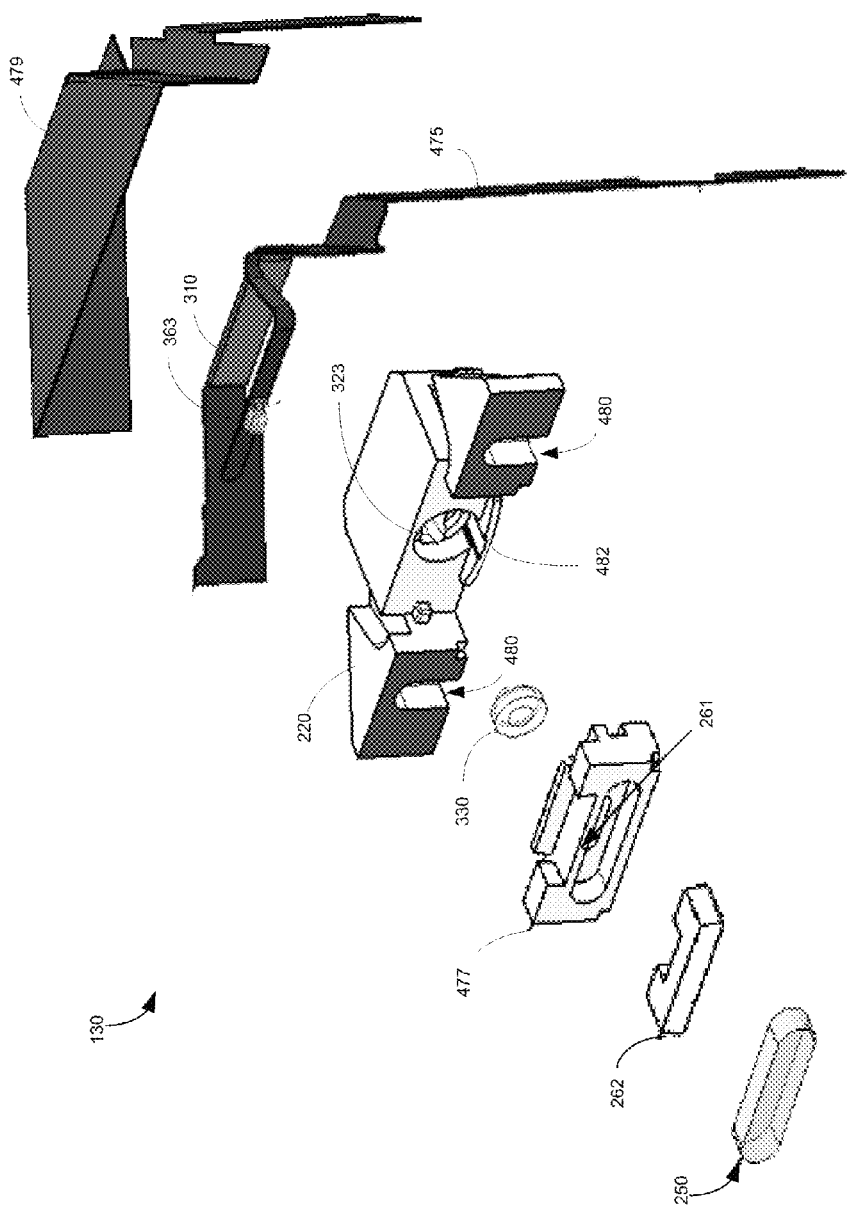
FIG. 4A is an exploded view of an alternative exemplary optical position sensor assembly according to the present invention.

FIG. 4 illustrates one of the alternate embodiments of the optical position sensor assembly 130 of the present invention. FIG. 4A provides an exploded view of the alternate optical sensor assembly 130. In this embodiment, the illumination source 363 and optical sensor 310 are mounted to a flexible printed circuit board 475. As shown, the flexible printed circuit board 475 is configured such that the illumination source 363 is above and forward of the optical sensor 310. The flexible printed circuit board 475 is positioned around the opaque body 220 such that the optical sensor 310 is situated behind an opening 323 in the body 220.

A lens holder 477 includes a slot and/or groove on its reverse side for holding the lens 330. The aperture 342 (not shown) is also integrated into the lens holder 477, either forward of or behind the lens 330. The lens holder 477 has openings on its front side for receiving the imaging window 250 and the illumination window 262. A portion of the lens holder 477 separates the imaging window 250 from the illumination window 262 and thus functions as the light path separator 261. The body 220 includes position guides 480 and an anti-wicking member 482.

An opaque cover 479 covers the optical position sensor assembly 130. The cover 479 may be formed of a flexible substrate and may optionally be sticky, so that it can be used to adhere the optical position sensor assembly 130 to a display 110 or overlay 112. This cover 479 must be opaque to the illumination wavelength. It is preferably absorbent to the illumination wavelength, rather than reflective. The adhesive on the cover 479, makes it optically integral with the top side of the illumination window 262. This and the use of an adhesive on the bottom face of the cover 479 to make it optically integral with the light path separator 261, prevents light piping on the two faces and enhances the directionality of the illumination. The illumination window 262 should be flush or sub-flush of the light path separator 261. This gives the design its high immunity to self blinding by dust on the windows.

Figure 4B:
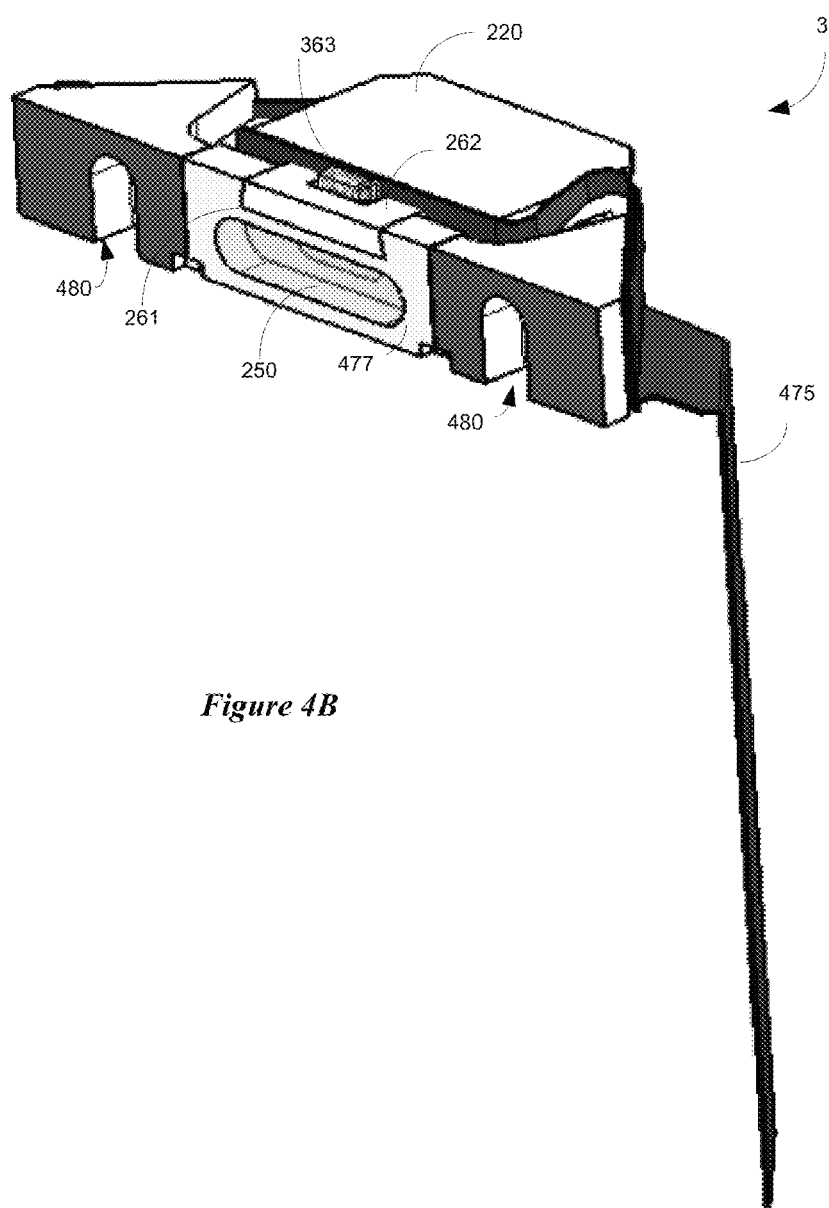
FIG. 4B is an illustration of the alternative exemplary optical position sensor assembly shown in FIG. 4A.
Figure 4C:
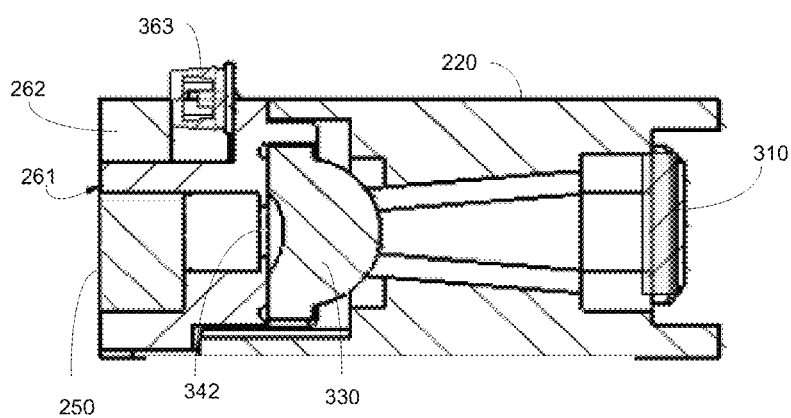
FIG. 4C is a sectional view of the alternative exemplary optical position sensor assembly shown in FIG. 4A.

FIG. 4B provides a perspective view of the alternate optical sensor assembly 130 (without cover 479 or anti-wicking member 482) and FIG. 4C provides a section view of the alternate optical sensor assembly 130 (without cover 479 or anti-wicking member 482).

Based on the foregoing, it can be seen that the present invention provides an improved optical position sensing system and optical position sensor assembly. Many other modifications, features and embodiments of the present invention will become evident to those of skill in the art. For example, those skilled in the art will recognize that embodiments of the present invention are useful and applicable to a variety of applications, including, but not limited to, personal computers, office machinery, gaming equipment, and personal handheld devices. Accordingly, it should be understood that the foregoing relates only to certain embodiments of the invention, and are presented by way of example rather than limitation. Numerous changes may be made to the exemplary embodiments described herein without departing from the spirit and scope of the invention as defined by the following claims.

What is claimed is:

1. An optical position sensor assembly, comprising:
    a body having a front face and a rear face and an opening therethrough;
    a lens holder having a first side and a second side, wherein the first side comprises an imaging window having an inside face that is shaped to form a shallow convex surface, wherein the second side holds a single element aspherical lens, and wherein the lens holder is mounted to the front face of the body such that the lens is aligned with the opening;
    an optical sensor mounted to the rear face of the body and positioned such that it is aligned with the opening; and
    a radiation source positioned within the body above the lens holder and behind an illumination window.

2. The optical position sensor assembly of claim 1, further comprising a light path separator positioned between the illumination window and the imaging window, such that a path of radiation emitted by the radiation source is optically separated from a view path of the optical sensor.

3. The optical position sensor assembly of claim 2, wherein the light path separator comprises a flexible printed circuit board for driving the radiation source.

4. The optical position sensor assembly of claim 2, wherein the light path separator is an integral component of the lens holder.

5. The optical position sensor assembly of claim 1, wherein the imaging window is dyed to pass a wavelength of radiation emitted by the radiation source and to reject other wavelengths of radiation.

6. The optical position sensor assembly of claim 5, wherein the imaging window is dyed with an optical notch dye.

7. The optical position sensor assembly of claim 1, wherein the lens has an f-theta characteristic.

8. The optical position sensor assembly of claim 1, further comprising an aperture between the second side of the lens holder and the lens.

9. The optical position sensor assembly of claim 1, further comprising an aperture between the lens and the optical sensor.

10. The optical position sensor assembly of claim 1, wherein the lens position is fixed and the focus of the lens is adjusted by changing the position of the optical sensor relative to the body.

11. The optical position sensor assembly of claim 1, wherein the radiation source and the optical sensor are mounted to a flexible printed circuit board.

12. The optical position sensor assembly of claim 1, wherein the body includes one or more alignment features for mounting the optical position sensor assembly to a flat surface.

13. The optical position sensor assembly of claim 1, wherein the optical sensor is encapsulated with an encapsulant; and wherein the encapsulant is shaped to form a lensed surface.

14. The optical position sensor assembly of claim 13, wherein the lensed surface is convex in a long axis of a photodiode area of the optical sensor.

15. An optical position sensing system, comprising:
    a display;
    a bezel surrounding the display;
    at least one position sensor assembly for emitting radiation to cause illumination of the bezel and for generating data signals representing detected variations in said illumination;
    a processor for processing said data signals to calculate a location of a touch relative to the display; and
    wherein each optical position sensor assembly comprises:
        a body having a front face and a rear face and an opening therethrough,
        a lens holder having a first side and a second side, wherein the first side comprises an imaging window having an inside face that is shaped to form a shallow convex surface and the second side holds a single element aspherical lens, and wherein the lens holder is mounted to the front face of the body such that the lens is aligned with the opening,
    an optical sensor mounted to the rear face of the body and positioned such that it is aligned with the opening, and
    a radiation source positioned within the body above the lens holder and behind an illumination window.

16. The optical position sensing system of claim 15, further comprising a light path separator positioned between the illumination window and the imaging window, such that a path of radiation emitted by the radiation source is optically separated from a view path of the optical sensor.

17. The optical position sensing system of claim 16, wherein the light path separator comprises a flexible printed circuit board for driving the radiation source.

18. The optical position sensing system of claim 16, wherein the light path separator is an integral component of the lens holder.

19. The optical position sensing system of claim 15, further comprising reflectors mounted to a face of the bezel that is perpendicular to a viewing area of the display.

20. The optical position sensing system of claim 19, wherein the reflectors comprise retroreflective material.

21. The optical position sensing system of claim 20, wherein the retroreflective material comprises a prismatic film.

22. The optical position sensing system of claim 15, wherein the at least one optical position sensor assembly is mounted to an overlay that is positioned over the display.

23. The optical position sensing system of claim 15, wherein the imaging window is dyed to pass a wavelength of radiation emitted by the radiation source and to reject other wavelengths of radiation.

24. The optical position sensing system of claim 23, wherein the imaging window is dyed with an optical notch dye.

25. The optical position sensing system of claim 15, wherein the lens has an f-theta characteristic.

26. The optical position sensing system of claim 15, further comprising an aperture between the second side of the lens holder and the lens.

27. The optical position sensing system of claim 15, further comprising an aperture between the lens and the optical sensor.

28. The optical position sensing system of claim 15, wherein the lens position is fixed and the focus of the lens is adjusted by changing the position of the optical sensor relative to the body.

29. The optical position sensing system of claim 15, wherein the radiation source and the optical sensor are mounted to a flexible printed circuit board.

30. The optical position sensing system of claim 15, wherein the body includes one or more alignment features for mounting the optical position sensor assembly to a flat surface.

31. The optical position sensing system of claim 15, wherein the optical sensor is encapsulated with an encapsulant; and wherein the encapsulant is shaped to form a lensed surface.

32. The optical position sensing system of claim 31, wherein the lensed surface is convex in a long axis of a photodiode area of the optical sensor.

* * * * *